United States Patent [19]
Bland

[11] 4,387,931
[45] Jun. 14, 1983

[54] TIRE PRESSURE CONTROL IN A VEHICLE
[75] Inventor: William M. Bland, Willingboro, N.J.
[73] Assignee: The Budd Company, Troy, Mich.
[21] Appl. No.: 253,703
[22] Filed: Apr. 13, 1981
[51] Int. Cl.³ .......................... B60T 7/12; B60C 23/10
[52] U.S. Cl. ........................................ 303/1; 152/416; 303/9
[58] Field of Search ................... 303/13, 28, 71, 84 R, 303/84 N, 86, 1, 9; 188/70 R, 70 B; 137/224, 225; 152/416, 417; 280/81 R; 152/415

[56] References Cited
U.S. PATENT DOCUMENTS
2,871,906  2/1959  Courchesne .................... 152/418
3,302,682  2/1967  Berg ................................ 152/415

FOREIGN PATENT DOCUMENTS
1071917  12/1959  Fed. Rep. of Germany .... 303/84 R

Primary Examiner—Duane A. Reger
Attorney, Agent, or Firm—Edward M. Farrell; Herman Foster; Thomas I. Davenport

[57] ABSTRACT

A source of relatively high air pressure is connected to a pressure regulator which provides a lower relatively uniform predetermined pressure to a plurality of tires on wheels of a vehicle. If the pressure in any one of the tires drop below the others, the pressure from the regulator automatically brings it up to the uniform pressure.

12 Claims, 9 Drawing Figures

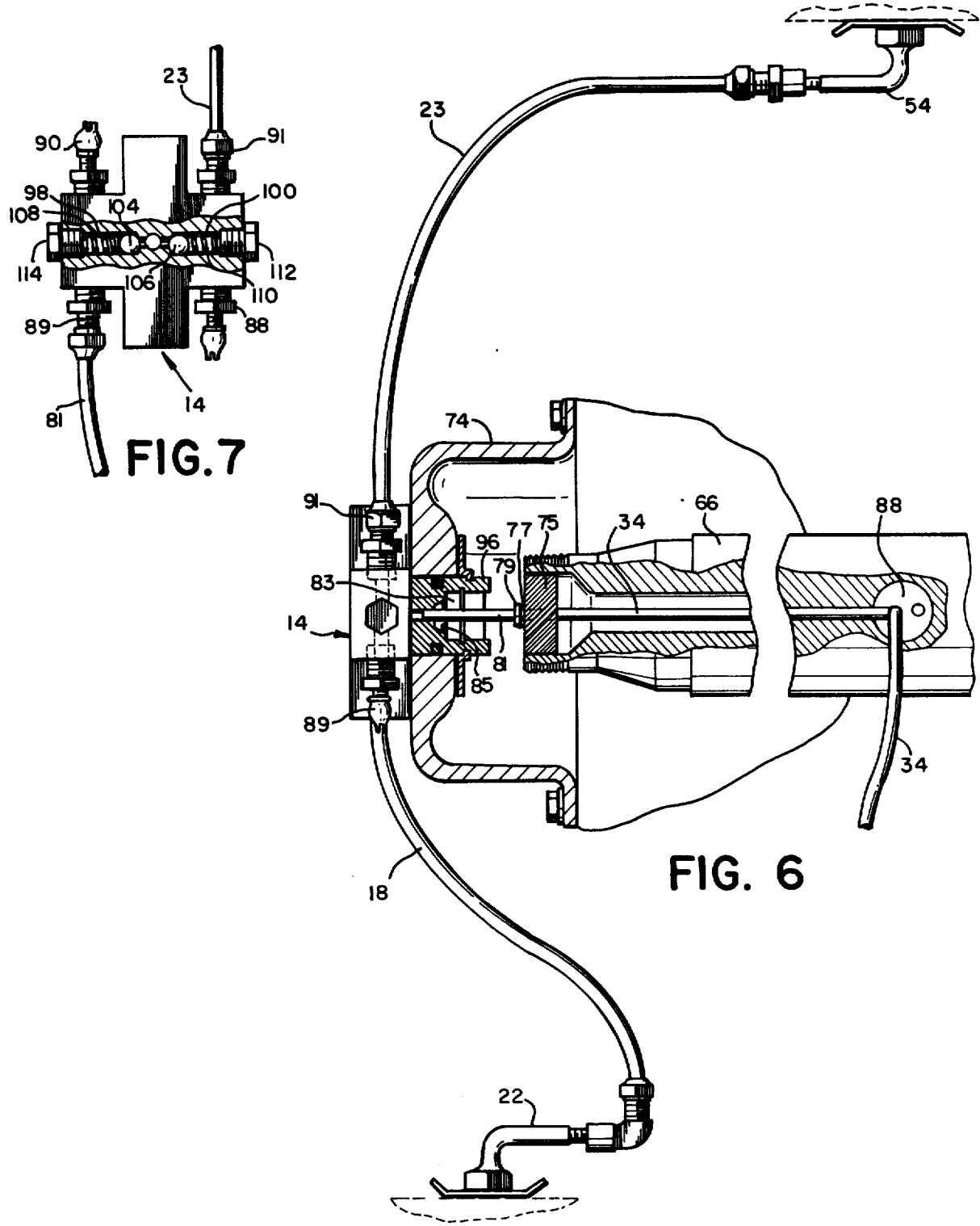

TIRE PRESSURE CONTROL IN A VEHICLE

BACKGROUND OF THE INVENTION

One of the problems encountered in many tractor-trailer systems involves maintaining the air pressure in the tires. This is especially true when multiple sets of dual type wheels are used. A low pressure in one of the tires will often go undetected for long periods of time because the other wheels and tires in the vehicle are sufficient to support the loads.

Most drivers periodically check the tires of tractor-trailer vehicles during stop overs by tapping the tires with a tool. However, this precaution is sometimes overlooked and, in any case, not effective for detecting low pressure in a tire during operation between checks. In most cases, a driver has no warning when the pressure in one of a number of tires drops below a safe operating level while he is driving the vehicle. Such low pressures during operation may result from slow leaks in the tire, for example.

Low pressure in one of the tires during operation may cause any one of a number of serious problems. If the pressure in one of a group of tires is too low, it may cause the tire having the low pressure to spin because the tire does not make adequate traction with the road. This may cause the tire to heat up and possibly cause a fire. The spinning of the poorly inflated tire may also cause shredding and destruction of the tire which, if the low pressure were detected in time, could be recappable.

In a tire pressure and maintenance system in a tractor-trailer, it is desirable that the system utilize the source of pressure already available. Also, if for some reason the system fails, it is desirable to have independent means for inflating the tires and for detecting the pressure therein. It is also desirable in many cases to brake the vehicle to prevent movement thereof when a large leak in one of the tires develops.

OBJECTS OF THE INVENTION

It is an object of this invention to provide an improved tire inflation system for maintaining a plurality of tires on a vehicle at predetermined uniform pressures.

It is a further object of this invention to provide a tire inflation system for a plurality of tires in a vehicle in which excessively low pressure in one of the tires will automatically cause braking to be applied to a vehicle.

It is still a further object of this invention to provide a system for warning a driver of a vehicle when pressure in a tire is excessively low so that he may avoid possible fire or shredding and other destruction to the tire.

It is still a further object of this invention to provide an improved tire pressure regulating system in a tractor-trailer system in which the normal source of braking pressure is utilized to inflate and maintain the pressures in the tires.

It is still a further object of this invention to provide an improved tire pressure maintenance system in which the tires may be inflated or checked independent of the system.

BRIEF SUMMARY OF THE INVENTION

In accordance with the present invention, means for equalizing and maintaining the pressures in a plurality of tires in a vehicle during operation is provided. A source of relatively high air pressure, such as from an emergency reservoir in a trailer, supplies air to a regulator valve. The regulator valve reduces the pressure to a predetermined uniform level and supplies the reduced air pressure to adapter units connected to rotate with the wheels of the vehicle. The adapter units connect the reduced air pressure to the tires. If pressure in one of the tires drops below the regulated uniform level, it does not affect the pressures in the other tires and the regulated air pressure from the regulator passes through the appropriate adapter unit to the tire with the lowered pressure thereby maintaining uniform pressure in all of the tires involved.

Other objects and advantages of the present invention will be apparent and suggest themselves to those skilled in the art from a reading of the following specification and claims, taken in conjunction with the accompanying drawings.

BRIEF DESCRIPTION OF THE DRAWINGS

FIG. 6 is a side view, partly in cross-section illustrating details of the connections made to a single wheel and tire;

FIG. 7 is a front view of the adapter unit illustrated in FIG. 6;

DETAILED DESCRIPTION OF THE PREFERRED EMBODIMENTS

Figure 1:
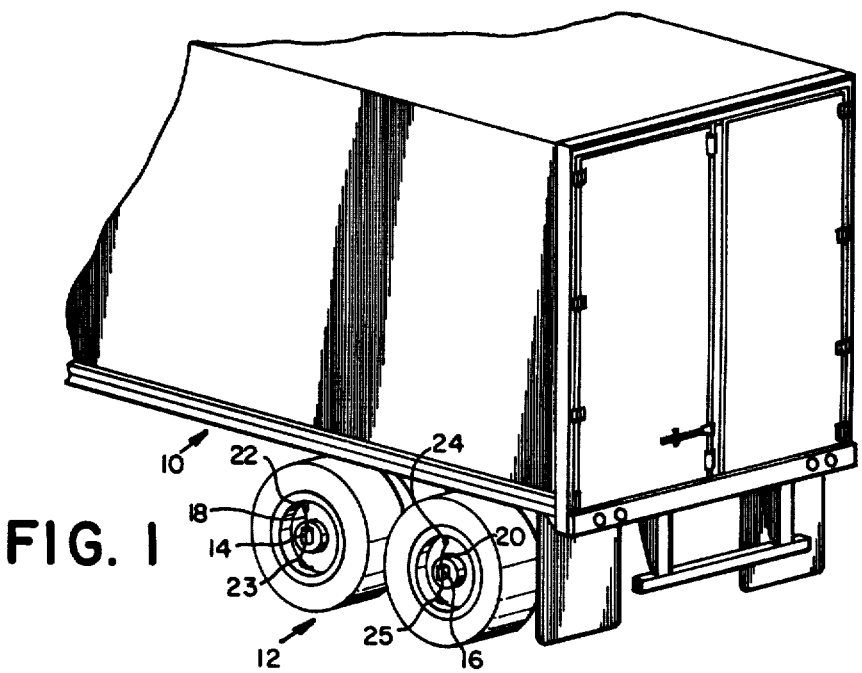
FIG. 1 is a partial view of the rear end of a trailer having dual multiple wheels illustrating one embodiment in which the present invention may be employed.

Referring particularly to FIG. 1, a trailer 10 is supported by a pluraltiy of dual sets of wheels 12. The wheels 12 are used in conjunction with the air pressure detection and maintenance system of the present invention. Adapters 14 and 16 are connected to the outside tires illustrated through conduits 18 and 20, respectively to two stems 22 and 24 which permit the tires associated therewith to be inflated. Other conduits 23 and 25 lead from the adapters 14 and 16, respectively, to the tires of the inner wheels paired with the outer wheels illustrated. The various details and connections to the adapter units 14 and 16 will be described in greater detail in the subsequent figures of the drawings.

Figure 2:
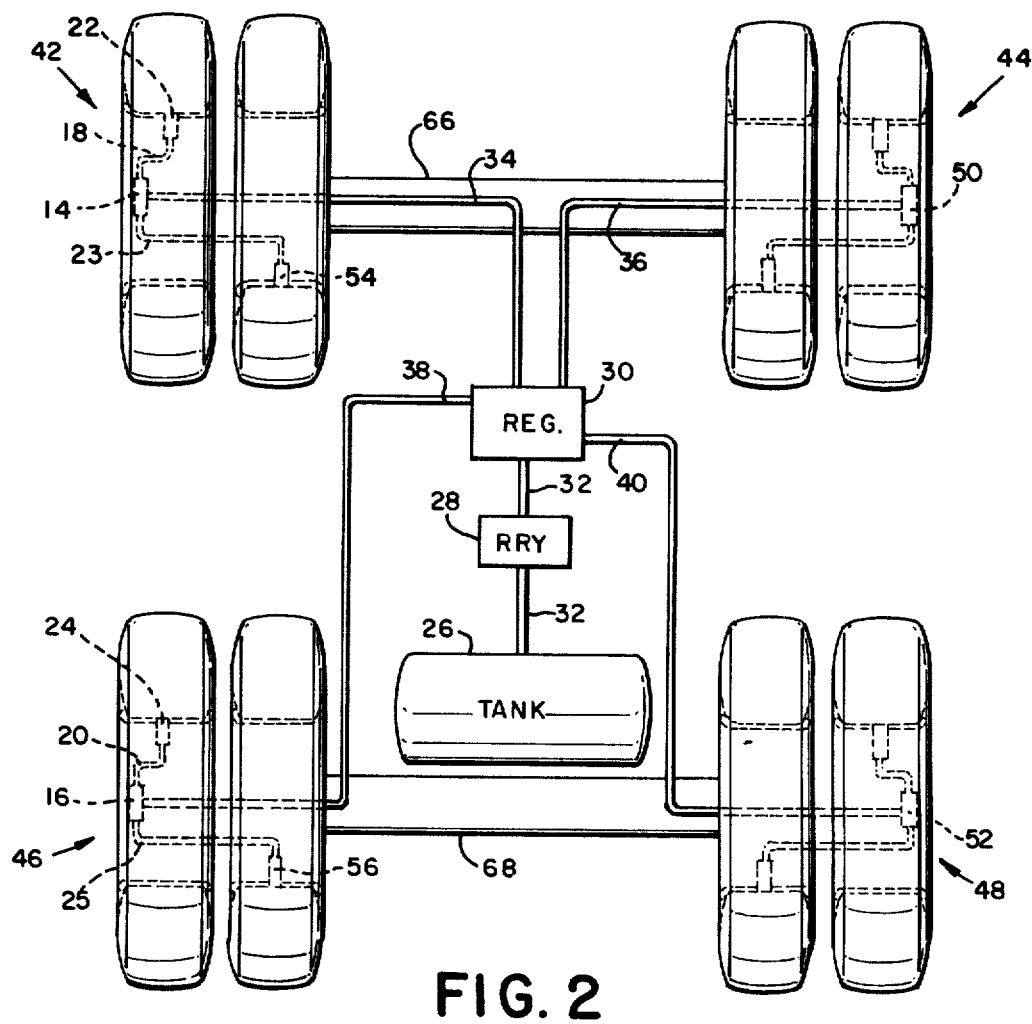
FIG. 2 is a somewhat schematic view of a typical dual multiple wheel trailer taken above the wheels illustrated in FIG. 1 and illustrating the general arrangement of parts, in accordance with the present invention.

Referring to FIG. 2, the four sets of dual wheels or tires shown in FIG. 1 are generally illustrated. The positions of the wheels are the same for both figures for purposes of explanation. Only the two pairs of the outer wheel unit connections will be described, it being understood that the explanation is also applicable to the wheels not described. The purpose of the components illustrated is to inflate the tires of the wheels and to maintain the pressures therein at some predetermined uniform levels. In a typical system it may be desirable to keep all the tires on the trailer at a uniform set pressure somewhere between 85 and 90 psi. The exact pressures will be determined by customer requirements and tire design.

In the present invention, the air for inflating the tires is provided by a source of pressure already in the system, such as an emergency tank 26. In a conventional trailer, the pressure in the emergency tank 26 is supplied by an air compressor in the tractor (not illustrated). The air pressure in the emergency tank 26 may normally be between 110 and 120 psi.

Sources of pressures for braking and the like provided by emergency tanks in trailers are well known. The pressure from the emergency tank 26 is applied to a ratio relay valve 28. As in conventional systems, the ratio relay valve 28 may be utilized to connect the pressure from the emergency tank 26 to overcome the parking brake pressure provided by mechanical springs during parking, when the air pressure is disconnected from the tractor, or any time that the pressure in the emergency tank 26 drops below a safe operating level, such as 60 psi. Under any of these conditions, when the pressure in the emergency tank 26 drops, the ratio relay valve 28 removes the pressure from the braking system to permit the mechanical springs to mechanically brake the wheels. This causes the parking brakes to be automatically engaged. All of these comments relating to the ratio relay valve 28 are conventional and will not be elaborated upon.

The pressure from the emergency tank 26 passes through the ratio relay valve 28 to a pressure regulator 30. The pressure regulator 30 has a single inlet 32. The regulated pressure from the regulator 30 includes four outlets 34, 36, 38 and 40. The outlets 34 and 36 are connected toward the pairs of dual multiple wheel units 42 and 44. The outlets 38 and 40 are connected toward the dual multiple wheel units 46 and 48, respectively. The pressure regulator 30 may be of a type manufactured by Bendix RV-1 Pressure Reducing Valve, such as part number 279015.

As will be described in greater detail, the conduits 34 and 36 are connected to adapter units 14 and 50. The conduits 38 and 40 are connected to adapter units 16 and 52. Each of the adapter units are adapted to connect the source of regulated pressure from the regulator 30 to the pairs of tires on each of the wheel units 42, 44, 46 and 48. The adapter units 14 and 16 include tubings 18 and 20 connected to the stems 22 and 24 of the outer wheels of the sets 42 and 46. The adapter units 14 and 16 also include tubing or conduits 23 and 25 leading to the stems 54 and 56 of the tires of inner wheels of the wheel sets 42 and 46. The adapter units 50 and 52 include connections similar to the adapter units 14 and 16.

In describing in detail the present invention, the various connections for only one of the wheel units 42, 44, 46 and 48 will be illustrated in detail. It will be understood that each of the units operate in substantially the same manner. Each of the adapter units 14, 16, 50 and 52 is designed to accommodate both of the tires of the wheel unit with which it is associated.

Figure 4:
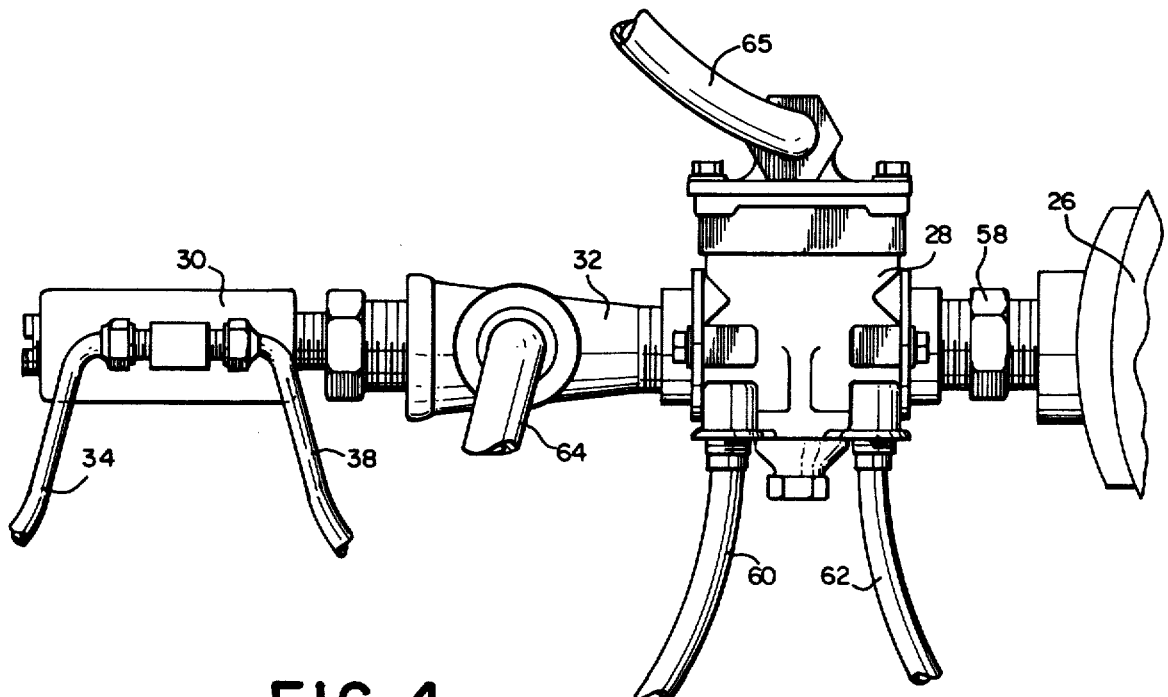
FIG. 4 is a side view illustrating in greater detail components illustrated in FIG. 2.
Figure 5:
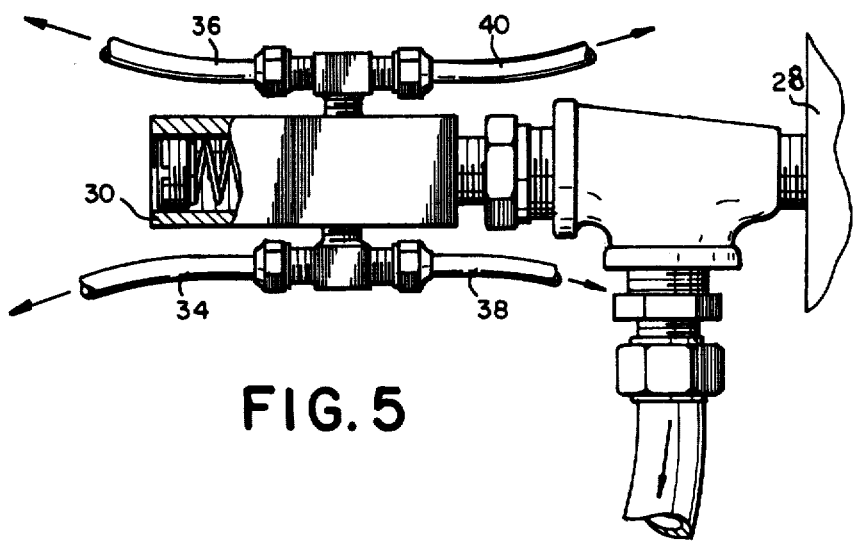
FIG. 5 is a top view of some of the main components illustrated in FIG. 4.

Referring to FIGS. 4 and 5, along with FIG. 2, the pressure from the tank 26 is applied through a suitable connector 58 to the ratio relay valve 28. The ratio relay valve 28, which may be of a commercial type manufactured by Sealco, Type No. 110190, includes various connections found in conventional trailers. The ratio relay valve 28 is connected to a conduit 60 which may be connected to chambers in the front axle and a conduit 62 which may be connected to brake chambers leading to the rear axle. The ratio relay valve 28 also is connected to a brake relay valve through a conduit 65.

For purposes of describing the present invention, it will be assumed that the ratio relay valve 28 operates in a manner previously mentioned and applies pressure to the inlet 32 to the pressure regulator 30. A connection 64 leads to an air tank and is not directly related to the present invention. The various connections or conduits 34, 36, 38 and 40 (FIG. 2) are connected from the regulator 32 through suitable "T" connectors to their respective adapter units.

Figure 3:
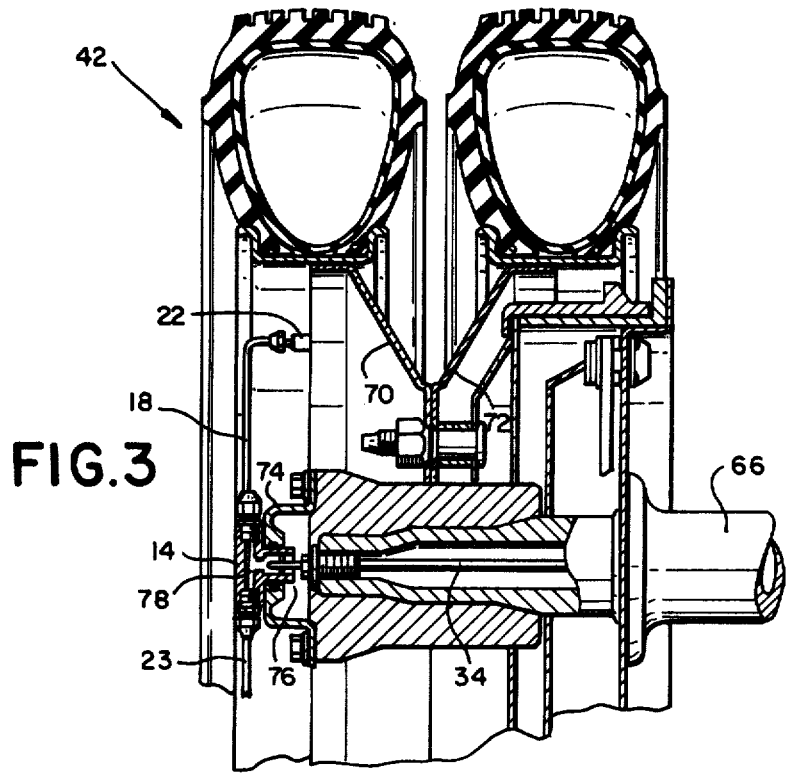
FIG. 3 is a partial enlarged view of one of the sets of dual wheels and tires illustrated in FIGS. 1 and 2 showing some of the details involved in the present invention.

As illustrated in FIG. 2, the conduits 34 and 36 are connected toward and through axle unit 66 which for purposes of explanation may be considered the front axle. The conduits 38 and 40 are connected toward and through the rear axle 68. The various conduits are inserted into the hollow axles 66 and 68 and are passed through the axle units to the ends of the wheels to their respective adapter units. Details of the various connections to the tires of a particular wheel unit are illustrated in FIGS. 3, 6 and 7. Assume that this unit is wheel unit 42.

Referring to FIGS. 3, 6 and 7, the unit 42 includes the adapter 14 which receives a conduit 34 which passes through the hollow axle 66. The wheel unit 42 illustrated includes a pair of wheels 70 and 72 which are suitably secured together by conventional means. A hub cap 74 is secured to the outer wheel 70. The adapter unit 14 is secured to the hub cap 74 and is adapted to rotate with the wheel and the hub cap. A rotatable seal arrangement 76 is adapted to connect the air from the conduit 34 into the adapter unit 14 while the wheels are rotating. Air pressure from the conduit 34 within the axle 66 is connected to the adapter unit 14 which is secured to the hub cap 74 of the wheel 70. Basically, the sealing connections to permit the transfer of the air from the interior of the axle to the hub cap while rotating may take a number of different forms of which the seal illustrated is only one example. As more clearly illustrated in FIG. 6, the conduit 34 passes through a plug 75 to which are attached a bushing 77 held by a ferrule 79. A sleeve 81 provides a continuation of the air path for the conduit 34 leading into the adapter unit through spacer 83 and lip seal 85. A retainer ring holds the sleeve 81 in alignment. The entire assembly including the hub cap and adapter unit rotates with the wheel.

The air within the conduit 34 is transfered to the open space 78 within the adapter unit 14 (FIG. 3). The open area 78 includes leads to a number of open paths to which the air pressure passes. Two of the paths involve transferring the air from the adapter 14 to the tire stems 22 and 54 of the wheels 70 and 72. As illustrated in FIG. 3, the conduit 18 connects the adapter unit 14 to the stem 22 assembly which leads to the interior of the tire. Another conduit 23 from the adapter unit 14 leads to the tire stem 54 assembly of the inner wheel 72 (FIG. 6).

As illustrated in FIG. 6, still assuming that the wheel unit 42 is involved, the conduit 34 from the regulator 30 is connected through a plug 88 in the axle 66. The conduit 34 continues as inner conduit 34. Although sometimes separate tubings may be involved, the path relating to the conduit 34 will be referred to as just the conduit 34. As mentioned, the conduit 34 connects the pressure regulator 30 (FIG. 2) to the adapter unit 14.

The adapter unit 14 is suitably secured to the hub cap 74. Two valve outlets 89 and 91 (FIG. 7) from the adapter unit 14 lead to the conduits 18 and 23, respectively, which lead to their respective tire valve stems 22 and 54.

Figure 9:
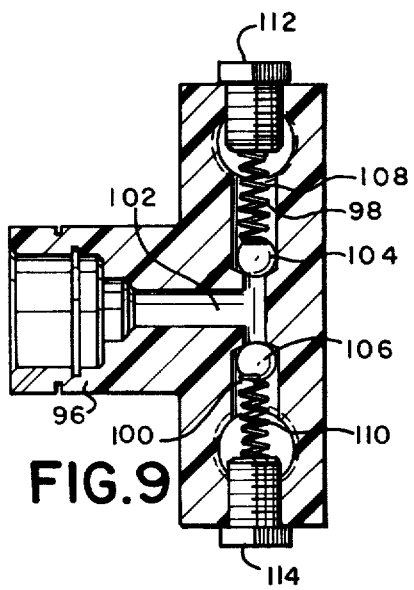
FIG. 9 is an enlarged side view, partly in cross-section, illustrating in greater detail the adapter unit illustrated in FIG. 7.
Figure 8:
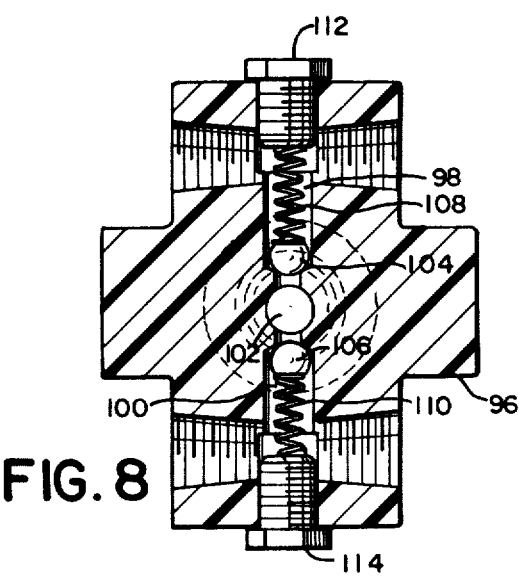
FIG. 8 is a front view illustrating details of one of the adapter units of a type used in the present invention.

Referring to FIGS. 7-9, various views of the adapter unit 14 is illustrated. It is noted that the adapter unit 14 includes four valve outlets 88, 89, 90 and 91. The valve 91 is connected to the conduit 23 and the valve 89 is connected to the conduit 18. These valves 89 and 91 permit the air from inside the adapter unit 14 to be passed onto the valve stems 22 and 54 of the tires. The valve 88 provides an additional service valve for the tire on the inner wheel 72. In like manner, the valve 90 provides service for the tire of the outer wheel 70. The reason the additional valve 88 and 90 are provided is to permit a driver to apply external air pressure to the tires if desired. For example, in the system described, when the emergency tank is used, it may take about 15 minutes to fully inflate the tires when all tires are fully deflated. If it is desired to inflate the tires quickly, the valves 80 and 90 provide the means for doing so. In addition, an operator may use a tire gauge to actually check the pressures within the system if there is any doubt in his mind as to the proper operation of the system.

The adapter unit includes a portion 96 (FIGS. 6 and 9) adapted to pass through the hub cap 74 to provide means for connection to the conduit 34. Any suitable means for securing the adapter unit 50 to the hub cap 74 may be employed. In the embodiment illustrated, metal washers and an external retainer ring fit into a groove in portion 96 are used. Pressure entering into the adapter unit is diverted into two separate paths 98 and 100 from the connecting chamber 102. These connecting chambers, or paths 98 and 100, lead to the valves 89 and 91 which are connected to the conduits 18 and 23, respectively. Thus, they lead to the particular tires involved.

As illustrated in FIGS. 7, 8 and 9, the paths or chambers 98 and 100 include steel ball bearings 104 and 106 which are adapted to seat within the paths or chambers 98 and 100. Each of the balls 104 and 106 are spring loaded and held in place by springs 108 and 110. The springs are held in tension by caps 112 and 114 which threadedly engage the adapter unit.

The balls 104 and 106 are held on their seats by the springs 108 and 110. When the chamber 102 on the regulator side is stronger than the air chamber 108 or 110 at the tire sides, one of the balls 104 or 106 associated with the spring 108 or 110 is pushed away from the seat against the tension of the spring to permit air to go around the particular ball. With the pressure from the regulator 30 (FIG. 2) regulated at 85 psi, for example, the pressure is normally the same on both sides of the springs 108 and 110. If the regulator pressure is higher than the pressure within a particular tire, a low pressure in the tire involved is indicated. The pressure from the regulator 30 through the particular conduit involved pushes the appropriate ball against the appropriate spring in the adapter unit to cause air to pass from the regulator 30 into the tire with the lower pressure. If one of the tires associated with any of the ball bearings in any adapter unit drops, air will be supplied from the regulator. Thus all the tires illustrated in FIG. 1 will be regulated by the system described.

A feature of the present invention is that if there is a massive leak in one of the tires, the regulator 30 (FIG. 2) will provide air continuously from the tank 26. This will cause the pressure in the emergency tank 26 to decrease. If the pressure in the emergency tank decreases to below 60 psi, for example, the ratio relay valve 28 (FIG. 2) operates to remove the air pressure from the brakes and cause the mechanical spring brakes to be applied to the vehicle. Because the application of the mechanical spring brakes will cause the trailer to drag, the driver will receive a warning and generally stop and get out to examine the tires. Thus, the driver receives a warning before the tire begins to heat up or shred to cause irreparable damage to the tire. Having this warning sufficiently soon will enable the driver to have the tire recapped when required or desired. He will also have time to reinflate the tire temporarily while he drives the vehicle to a place of repair.

Thus, the present invention has provided means for inflating the tires in a trailer with means normally employed in the trailer, such as the emergency tank. The system provides an early warning to the driver to prevent damage to the tire or possible fire to the trailer. In addition, for relatively low drops in pressure, the system responds quickly to equalize all the pressures in all of the tires quickly.

What is claimed is:

1. In combinatin with a vehicle having a plurality of rotatable wheels with air pressurized tires thereon,
   means for equalizing and maintaining a predetermined level of uniform air pressure in said tires comprising:
   (a) a source of pressurized air;
   (b) a pressure regulator for regulating air pressure at said predetermined level of uniform air pressure,
   (c) said pressure regulator having inlet means and a plurality of outlet means;
   (d) means for applying pressurized air from said source of pressurized air to said inlet means of said regulator to provide said predetermined level of uniform air pressure at said plurality of outlet means; and
   (e) means for applying said predetermined level of uniform air pressure through said outlet means to said tires of said vehicle to maintain the pressure in said tires at said predetermined level of uniform air pressure.

2. A combination as set forth in claim 1 wherein said plurality of rotatable wheels include a plurality of dual wheel sets with air pressurized tires thereon.

3. A combination as set forth in claim 2 wherein said source of pressurized air comprises a tank secured to said vehicle.

4. In combination with a vehicle having a plurality of wheel sets of rotatable wheels with air pressurized tires thereon,
   means for equalizing and maintaining uniform the air pressure in said tires comprising:
   (a) an adaptor unit connected to each of said dual wheel sets;
   (b) a source of pressurized air comprising a tank secured to said vehicles;
   (c) a pressure regulator for regulating air pressure applied thereto to provide relatively uniform air pressure;
   (d) said pressure regulator having inlet means and a plurality of outlet means;
   (e) means for applying pressurized air from said source of pressurized air to said inlet means of said regulator to provide uniform air pressure at said plurality of outlet means;

(f) conduit means to connect said outlet means from said pressure regulator to each said analyzer unit; and (g) connecting conduit means for applying said uniform air pressure through said outlet means and said each adaptor unit to each of said tires on said dual wheel set of said vehicle to maintain the pressure in said tires relatively uniform.

5. A combination as set forth in claim 4 wherein each set adapter unit includes separate means for supplying air pressure to each of the tires on a dual wheel set independently of the air pressure from said pressure regulator, said separate means further providing means for checking the air pressure in each of the tires.

6. A combination as set forth in claim 5 wherein each said adapter unit is connected to a hub secured to each set of dual wheel units to rotate with said wheels.

7. A combination as set forth in claim 6 wherein said plurality of outlet means from said pressure regulator include tubular conduits passing through hollow axles on said vehicles to the adapter units on said dual wheel units.

8. A combination as set forth in claim 7 wherein each said adapter unit includes an inlet air passage connected to one of said tubular conduits and a pair of outlet air passages connected to said connecting conduit means leading to each of the two tires on said dual wheel unit.

9. A combination as set forth in claim 8 wherein biasing means are provided in each of said outlet air passages to maintain the air pressures in each of said two tires on each of said wheel units at the same air pressure as said pressure regulator.

10. A combination as set forth in claim 9 wherein said biasing means includes a spring biasing a ball to normally block said air passages in said adapter, with the pressure from said regulator overcoming the bias of said spring to unblock said air passages when the pressure in on of said tires drops below the pressure of said pressure regulator.

11. A combination as set forth in claim 10 wherein said tank comprises an emergency tank in a trailer portion of said vehicle and a ratio relay valve is connected between said emergency tank and said pressure regulator and air pressure from said emergency tank is connected through said ratio relay valve to overcome mechanical parking brakes in said trailer, said mechanical parking brakes being maintained in braking positions when the pressure from said emergency tank drops below a predetermined level.

12. A combination as set forth in claim 11 wherein excessive leaks in one of said tires on said vehicle causes the pressure in said emergency tank to drop below said predetermined pressure thereby causing said mechanical brakes to be applied.

* * * * *